United States Patent
Kim et al.

(10) Patent No.: US 10,065,651 B2
(45) Date of Patent: Sep. 4, 2018

(54) ELECTRONIC DEVICE AND METHOD FOR DETERMINING A STATE OF A DRIVER

(71) Applicant: Samsung Electronics Co., Ltd., Gyeonggi-do (KR)

(72) Inventors: Do-yoon Kim, Gyeonggi-do (KR); Seong-je Cho, Gyeonggi-do (KR); Min-hyoung Lee, Gyeonggi-do (KR); Chul-ho Cho, Gyeonggi-do (KR); Han Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/461,078

(22) Filed: Mar. 16, 2017

(65) Prior Publication Data

US 2017/0327124 A1 Nov. 16, 2017

Related U.S. Application Data

(60) Provisional application No. 62/334,079, filed on May 10, 2016.

(30) Foreign Application Priority Data

Oct. 31, 2016 (KR) .......................... 10-2016-0143317

(51) Int. Cl.
*B60W 40/08* (2012.01)
*B60W 30/18* (2012.01)
(Continued)

(52) U.S. Cl.
CPC ............. *B60W 40/08* (2013.01); *B60N 2/002* (2013.01); *B60W 30/18* (2013.01); *B60W 50/14* (2013.01);
(Continued)

(58) Field of Classification Search
CPC .......... B60W 40/08; G08B 21/06; G06F 3/01; G05D 1/02; B60K 28/00; G01L 19/00;
(Continued)

(56) References Cited

U.S. PATENT DOCUMENTS 4,450,438 A 5/1984 Seko et al.
4,463,347 A 7/1984 Seko et al.
(Continued)

FOREIGN PATENT DOCUMENTS

EP 1 475 274 11/2004
JP H 11326084 11/1999
(Continued)

OTHER PUBLICATIONS

International Search Report dated Jul. 11, 2017 issued in counterpart application No. PCT/KR2017/003322, 13 pages.
(Continued)

*Primary Examiner* — Yuri Kan

(74) *Attorney, Agent, or Firm* — The Farrell Law Firm, P.C.

(57) ABSTRACT

Electronic devices and methods are provided in which a pressure applied, by a driver, to a seat of a moving object driven by the driver is sensed. A state of the driver is determined based on frequency characteristics with respect to a change in the pressure sensed by the sensor.

17 Claims, 16 Drawing Sheets

100

(51) Int. Cl.
*B60W 50/14* (2012.01)
*B60N 2/00* (2006.01)

(52) U.S. Cl.
CPC . *B60W 2040/0827* (2013.01); *B60W 2540/22* (2013.01); *B60W 2720/10* (2013.01)

(58) Field of Classification Search
CPC ......... G01L 19/14; B60N 2/002; B60N 2/914; G01C 21/3697
See application file for complete search history.

(56) References Cited

U.S. PATENT DOCUMENTS

| | | | |
|---|---|---|---|
| 4,492,952 A | 1/1985 | Miller | |
| 4,496,938 A | 1/1985 | Seko et al. | |
| 4,509,040 A | 4/1985 | Seko et al. | |
| 4,565,997 A | 1/1986 | Seko et al. | |
| 4,581,607 A | 4/1986 | Seko et al. | |
| 4,594,583 A | 6/1986 | Seko et al. | |
| 4,604,611 A | 8/1986 | Seko et al. | |
| 4,611,199 A | 9/1986 | Seko et al. | |
| 4,967,186 A | 10/1990 | Ludmirsky et al. | |
| 5,232,243 A * | 8/1993 | Blackburn | B60N 2/002 177/144 |
| 5,585,785 A | 12/1996 | Gwin et al. | |
| 5,675,313 A | 10/1997 | Keluskar | |
| 5,682,144 A | 10/1997 | Mannik | |
| 5,689,241 A | 11/1997 | Clarke, Sr. et al. | |
| 5,786,765 A | 7/1998 | Kumakura et al. | |
| 5,850,193 A | 12/1998 | Shimoura et al. | |
| 5,900,819 A | 5/1999 | Kyrtsos | |
| 5,910,773 A | 6/1999 | Brownlee | |
| 5,923,263 A | 7/1999 | Rodriquez | |
| 6,034,606 A | 3/2000 | Brownlee | |
| 6,130,617 A | 10/2000 | Yeo | |
| 6,191,694 B1 | 2/2001 | Brownlee | |
| 6,243,015 B1 | 6/2001 | Yeo | |
| 6,304,187 B1 | 10/2001 | Pirim | |
| 6,380,859 B1 | 4/2002 | Brownlee | |
| 6,392,550 B1 | 5/2002 | Najor | |
| 6,559,770 B1 | 5/2003 | Zoerb | |
| 6,717,518 B1 | 4/2004 | Pirim et al. | |
| 6,724,920 B1 | 4/2004 | Berenz et al. | |
| 6,771,064 B2 | 8/2004 | Leibowitz et al. | |
| 6,822,573 B2 | 11/2004 | Basir et al. | |
| 6,911,642 B2 | 6/2005 | Sartori et al. | |
| 7,091,867 B2 | 8/2006 | Wenatrand | |
| 7,116,234 B2 | 10/2006 | Mohri | |
| 7,138,922 B2 | 11/2006 | Strumolo et al. | |
| 7,202,792 B2 | 4/2007 | Zhang et al. | |
| 7,280,046 B2 | 10/2007 | Berg et al. | |
| 7,336,804 B2 | 2/2008 | Steffin | |
| 7,397,382 B2 | 7/2008 | Ikegami et al. | |
| 7,400,235 B2 | 7/2008 | Kawazoe et al. | |
| 7,423,540 B2 | 9/2008 | Kisacanin | |
| 7,463,157 B2 | 12/2008 | Victor et al. | |
| 7,482,937 B2 | 1/2009 | Chai et al. | |
| 7,528,731 B2 | 5/2009 | Zhang et al. | |
| 7,639,146 B2 | 12/2009 | Baura | |
| 7,663,495 B2 | 2/2010 | Hague et al. | |
| 7,680,302 B2 | 3/2010 | Steffin | |
| 7,719,431 B2 | 5/2010 | Bolourchi | |
| 7,821,409 B2 | 10/2010 | Ishida | |
| 7,830,266 B2 | 11/2010 | Nakagoshi et al. | |
| 7,948,387 B2 | 5/2011 | Ishida et al. | |
| 7,983,811 B2 | 7/2011 | Basir et al. | |
| 8,022,831 B1 | 9/2011 | Wood-Eyre | |
| 8,044,782 B2 | 10/2011 | Saban | |
| 8,055,016 B2 | 11/2011 | Park et al. | |
| 8,063,786 B2 | 11/2011 | Manotas, Jr. | |
| 8,098,165 B2 | 1/2012 | Demirdjian et al. | |
| 8,140,149 B2 | 3/2012 | Hatakeyama et al. | |
| 8,200,417 B2 | 6/2012 | Hamaguchi | |
| 8,254,011 B2 | 8/2012 | Baur et al. | |
| 8,314,707 B2 | 11/2012 | Kobetski et al. | |
| 8,339,268 B2 | 12/2012 | Deng et al. | |
| 8,368,011 B2 | 2/2013 | Sakairi | |
| 8,369,608 B2 | 2/2013 | Gunaratne | |
| 8,370,605 B2 | 2/2013 | Nejah et al. | |
| 8,391,554 B2 | 3/2013 | Lee et al. | |
| 8,457,364 B2 | 6/2013 | Hiroshi | |
| 8,487,775 B2 | 7/2013 | Victor et al. | |
| 8,519,853 B2 | 8/2013 | Eskandarian et al. | |
| 8,537,000 B2 | 9/2013 | Nakagoshi et al. | |
| 8,576,081 B2 | 11/2013 | Hatakeyama et al. | |
| 8,631,893 B2 | 1/2014 | Van Shoiack | |
| 8,698,639 B2 | 4/2014 | Fung et al. | |
| 8,725,311 B1 | 5/2014 | Breed | |
| 8,743,193 B2 | 6/2014 | Bogner | |
| 8,836,784 B2 | 9/2014 | Erhardt et al. | |
| 8,862,317 B2 | 10/2014 | Shin et al. | |
| 8,866,622 B2 | 10/2014 | Lee et al. | |
| 8,866,896 B2 | 10/2014 | Hatakeyama | |
| 8,879,790 B2 | 11/2014 | Akiyama | |
| 8,902,070 B2 | 12/2014 | Kobetski et al. | |
| 8,917,182 B2 | 12/2014 | Chang et al. | |
| 8,952,819 B2 | 2/2015 | Nemat-Nasser | |
| 8,957,779 B2 | 2/2015 | Wu et al. | |
| 8,963,724 B2 | 2/2015 | Chang | |
| 9,007,220 B2 | 4/2015 | Johns et al. | |
| 9,031,774 B2 | 5/2015 | Suk et al. | |
| 9,033,892 B2 | 5/2015 | Su et al. | |
| 9,041,542 B2 | 5/2015 | Chang et al. | |
| 9,156,352 B2 | 10/2015 | Kim | |
| 9,165,452 B2 | 10/2015 | Li et al. | |
| 9,177,202 B2 | 11/2015 | Hanita et al. | |
| 9,205,844 B2 | 12/2015 | Yang et al. | |
| 9,226,705 B2 | 1/2016 | Austin et al. | |
| 9,260,013 B2 | 2/2016 | Kume et al. | |
| 9,292,471 B2 | 3/2016 | Fung et al. | |
| 9,296,382 B2 | 3/2016 | Fung et al. | |
| 9,308,914 B1 | 4/2016 | Sun et al. | |
| 2003/0151516 A1* | 8/2003 | Basir | G08B 21/06 340/575 |
| 2004/0260440 A1 | 12/2004 | Fujita et al. | |
| 2005/0121236 A1 | 6/2005 | Lauke et al. | |
| 2006/0283652 A1* | 12/2006 | Yanai | G08B 21/06 180/272 |
| 2012/0143391 A1* | 6/2012 | Gee | G06F 3/01 701/1 |
| 2012/0150387 A1 | 6/2012 | Watson | |
| 2014/0353048 A1* | 12/2014 | Kriger | B60N 2/002 177/1 |
| 2015/0008710 A1* | 1/2015 | Young | B60N 2/0276 297/217.3 |
| 2016/0001781 A1* | 1/2016 | Fung | G06F 19/345 701/36 |
| 2016/0018338 A1 | 1/2016 | Song et al. | |
| 2016/0101260 A1 | 4/2016 | Austin et al. | |
| 2017/0212525 A1* | 7/2017 | Wang | G01C 21/3697 |

FOREIGN PATENT DOCUMENTS

| | | |
|---|---|---|
| JP | 4439392 | 3/2010 |
| JP | 2011164825 | 8/2011 |
| KR | 1020160011047 | 1/2016 |
| KR | 1020160011048 | 1/2016 |
| KR | 101603404 | 3/2016 |

OTHER PUBLICATIONS

Park, Hee-Jin et al., Washable and Reusable Colorimetric Gas Sensor, pp. 2.
Kim, Do Yoon et al., Driver state monitoring method using pressure sensors, pp. 10.
Kim, Do Yoon et al., Driver state monitoring system using piezo-electric sensors, pp. 2.

\* cited by examiner

$$\underbrace{\begin{bmatrix} a_{11}^{(1)} & a_{12}^{(1)} & \cdots & a_{1n}^{(1)} \\ a_{21}^{(1)} & a_{22}^{(1)} & \cdots & a_{2n}^{(1)} \\ \vdots & \vdots & & \vdots \\ a_{m1}^{(1)} & a_{m2}^{(1)} & \cdots & a_{mn}^{(1)} \end{bmatrix}}_{F_1} \underbrace{\begin{bmatrix} a_{11}^{(2)} & a_{12}^{(2)} & \cdots & a_{1n}^{(2)} \\ a_{21}^{(2)} & a_{22}^{(2)} & \cdots & a_{2n}^{(2)} \\ \vdots & \vdots & & \vdots \\ a_{m1}^{(2)} & a_{m2}^{(2)} & \cdots & a_{mn}^{(2)} \end{bmatrix}}_{F_2} \underbrace{\begin{bmatrix} a_{11}^{(3)} & a_{12}^{(3)} & \cdots & a_{1n}^{(3)} \\ a_{21}^{(3)} & a_{22}^{(3)} & \cdots & a_{2n}^{(3)} \\ \vdots & \vdots & & \vdots \\ a_{m1}^{(3)} & a_{m2}^{(3)} & \cdots & a_{mn}^{(3)} \end{bmatrix}}_{F_3} \cdots \underbrace{\begin{bmatrix} a_{11}^{(M)} & a_{12}^{(M)} & \cdots & a_{1n}^{(M)} \\ a_{21}^{(M)} & a_{22}^{(M)} & \cdots & a_{2n}^{(M)} \\ \vdots & \vdots & & \vdots \\ a_{m1}^{(M)} & a_{m2}^{(M)} & \cdots & a_{mn}^{(M)} \end{bmatrix}}_{F_M}$$

$t = \frac{1}{T}$ sec $\quad\quad$ $t = \frac{2}{T}$ sec $\quad\quad$ $t = \frac{3}{T}$ sec $\quad\quad$ $t = \frac{M}{T}$ sec $1^{th}$ frame $\quad\quad$ $2^{th}$ frame $\quad\quad$ $3^{th}$ frame $\quad\quad$ $M^{th}$ frame

FIG. 5

$$F_2 - F_1 = \begin{bmatrix} a_{11}^{(2)} & a_{12}^{(2)} & \cdots & a_{1n}^{(2)} \\ a_{21}^{(2)} & a_{22}^{(2)} & \cdots & a_{2n}^{(2)} \\ \vdots & \vdots & & \vdots \\ a_{m1}^{(2)} & a_{m2}^{(2)} & \cdots & a_{mn}^{(2)} \end{bmatrix} - \begin{bmatrix} a_{11}^{(1)} & a_{12}^{(1)} & \cdots & a_{1n}^{(1)} \\ a_{21}^{(1)} & a_{22}^{(1)} & \cdots & a_{2n}^{(1)} \\ \vdots & \vdots & & \vdots \\ a_{m1}^{(1)} & a_{m2}^{(1)} & \cdots & a_{mn}^{(1)} \end{bmatrix} = \begin{bmatrix} a_{11}^{(2)} - a_{11}^{(1)} & a_{12}^{(2)} - a_{12}^{(1)} & \cdots & a_{1n}^{(2)} - a_{1n}^{(1)} \\ a_{21}^{(2)} - a_{21}^{(1)} & a_{22}^{(2)} - a_{22}^{(1)} & \cdots & a_{2n}^{(2)} - a_{2n}^{(1)} \\ \vdots & \vdots & & \vdots \\ a_{m1}^{(2)} - a_{m1}^{(1)} & a_{m2}^{(2)} - a_{m2}^{(1)} & \cdots & a_{mn}^{(2)} - a_{mn}^{(1)} \end{bmatrix} = F_1'$$

$$F_3 - F_2 = \begin{bmatrix} a_{11}^{(3)} & a_{12}^{(3)} & \cdots & a_{1n}^{(3)} \\ a_{21}^{(3)} & a_{22}^{(3)} & \cdots & a_{2n}^{(3)} \\ \vdots & \vdots & & \vdots \\ a_{m1}^{(3)} & a_{m2}^{(3)} & \cdots & a_{mn}^{(3)} \end{bmatrix} - \begin{bmatrix} a_{11}^{(2)} & a_{12}^{(2)} & \cdots & a_{1n}^{(2)} \\ a_{21}^{(2)} & a_{22}^{(2)} & \cdots & a_{2n}^{(2)} \\ \vdots & \vdots & & \vdots \\ a_{m1}^{(2)} & a_{m2}^{(2)} & \cdots & a_{mn}^{(2)} \end{bmatrix} = \begin{bmatrix} a_{11}^{(3)} - a_{11}^{(2)} & a_{12}^{(3)} - a_{12}^{(2)} & \cdots & a_{1n}^{(3)} - a_{1n}^{(2)} \\ a_{21}^{(3)} - a_{21}^{(2)} & a_{22}^{(3)} - a_{22}^{(2)} & \cdots & a_{2n}^{(3)} - a_{2n}^{(2)} \\ \vdots & \vdots & & \vdots \\ a_{m1}^{(3)} - a_{m1}^{(2)} & a_{m2}^{(3)} - a_{m2}^{(2)} & \cdots & a_{mn}^{(3)} - a_{mn}^{(2)} \end{bmatrix} = F_2'$$

$$\cdots$$

$$F_M - F_{M-1} = \begin{bmatrix} a_{11}^{(M)} & a_{12}^{(M)} & \cdots & a_{1n}^{(M)} \\ a_{21}^{(M)} & a_{22}^{(M)} & \cdots & a_{2n}^{(M)} \\ \vdots & \vdots & & \vdots \\ a_{m1}^{(M)} & a_{m2}^{(M)} & \cdots & a_{mn}^{(M)} \end{bmatrix} - \begin{bmatrix} a_{11}^{(M-1)} & a_{12}^{(M-1)} & \cdots & a_{1n}^{(M-1)} \\ a_{21}^{(M-1)} & a_{22}^{(M-1)} & \cdots & a_{2n}^{(M-1)} \\ \vdots & \vdots & & \vdots \\ a_{m1}^{(M-1)} & a_{m2}^{(M-1)} & \cdots & a_{mn}^{(M-1)} \end{bmatrix} = \begin{bmatrix} a_{11}^{(M)} - a_{11}^{(M-1)} & a_{12}^{(M)} - a_{12}^{(M-1)} & \cdots & a_{1n}^{(M)} - a_{1n}^{(M-1)} \\ a_{21}^{(M)} - a_{21}^{(M-1)} & a_{22}^{(M)} - a_{22}^{(M-1)} & \cdots & a_{2n}^{(M)} - a_{2n}^{(M-1)} \\ \vdots & \vdots & & \vdots \\ a_{m1}^{(M)} - a_{m1}^{(M-1)} & a_{m2}^{(M)} - a_{m2}^{(M-1)} & \cdots & a_{mn}^{(M)} - a_{mn}^{(M-1)} \end{bmatrix} = F_N'$$

FIG. 6

$$|F_1'| = \begin{bmatrix} |a_{11}^{(2)}-a_{11}^{(1)}| & |a_{12}^{(2)}-a_{12}^{(1)}| & \cdots & |a_{1n}^{(2)}-a_{1n}^{(1)}| \\ |a_{21}^{(2)}-a_{21}^{(1)}| & |a_{22}^{(2)}-a_{22}^{(1)}| & \cdots & |a_{2n}^{(2)}-a_{2n}^{(1)}| \\ \vdots & \vdots & \vdots & \vdots \\ |a_{m1}^{(2)}-a_{m1}^{(1)}| & |a_{m2}^{(2)}-a_{m2}^{(1)}| & \cdots & |a_{mn}^{(2)}-a_{mn}^{(1)}| \end{bmatrix} = \begin{bmatrix} |f_{11}|_1 & |f_{12}|_1 & \cdots & |f_{1n}|_1 \\ |f_{21}|_1 & |f_{22}|_1 & \cdots & |f_{2n}|_1 \\ \vdots & \vdots & & \vdots \\ |f_{m1}|_1 & |f_{m2}|_1 & \cdots & |f_{mn}|_1 \end{bmatrix}$$

$$|F_2'| = \begin{bmatrix} |a_{11}^{(3)}-a_{11}^{(2)}| & |a_{12}^{(3)}-a_{12}^{(2)}| & \cdots & |a_{1n}^{(3)}-a_{1n}^{(2)}| \\ |a_{21}^{(3)}-a_{21}^{(2)}| & |a_{22}^{(3)}-a_{22}^{(2)}| & \cdots & |a_{2n}^{(3)}-a_{2n}^{(2)}| \\ \vdots & \vdots & \vdots & \vdots \\ |a_{m1}^{(3)}-a_{m1}^{(2)}| & |a_{m2}^{(3)}-a_{m2}^{(2)}| & \cdots & |a_{mn}^{(3)}-a_{mn}^{(2)}| \end{bmatrix} = \begin{bmatrix} |f_{11}|_2 & |f_{12}|_2 & \cdots & |f_{1n}|_2 \\ |f_{21}|_2 & |f_{22}|_2 & \cdots & |f_{2n}|_2 \\ \vdots & \vdots & & \vdots \\ |f_{m1}|_2 & |f_{m2}|_2 & \cdots & |f_{mn}|_2 \end{bmatrix}$$

$$\vdots$$

$$|F_N'| = \begin{bmatrix} |a_{11}^{(M)}-a_{11}^{(M-1)}| & |a_{12}^{(M)}-a_{12}^{(M-1)}| & \cdots & |a_{1n}^{(M)}-a_{1n}^{(M-1)}| \\ |a_{21}^{(M)}-a_{21}^{(M-1)}| & |a_{22}^{(M)}-a_{22}^{(M-1)}| & \cdots & |a_{2n}^{(M)}-a_{2n}^{(M-1)}| \\ \vdots & \vdots & \vdots & \vdots \\ |a_{m1}^{(M)}-a_{m1}^{(M-1)}| & |a_{m2}^{(M)}-a_{m2}^{(M-1)}| & \cdots & |a_{mn}^{(M)}-a_{mn}^{(M-1)}| \end{bmatrix} = \begin{bmatrix} |f_{11}|_N & |f_{12}|_N & \cdots & |f_{1n}|_N \\ |f_{21}|_N & |f_{22}|_N & \cdots & |f_{2n}|_N \\ \vdots & \vdots & & \vdots \\ |f_{m1}|_N & |f_{m2}|_N & \cdots & |f_{mn}|_N \end{bmatrix}$$

FIG. 10

$$F_{L,M} = \begin{bmatrix} I_{11}^{(M)} & I_{12}^{(M)} & \cdots & I_{1\,n/2}^{(M)} \\ I_{21}^{(2)} & I_{22}^{(M)} & \cdots & I_{2\,n/2}^{(M)} \\ \vdots & \vdots & & \vdots \\ I_{m1}^{(M)} & I_{m2}^{(M)} & \cdots & I_{m\,n/2}^{(M)} \end{bmatrix} \quad F_{L,N}' = \begin{bmatrix} I_{11}^{(M)} - I_{11}^{(M-1)} & I_{12}^{(M)} - I_{12}^{(M-1)} & \cdots & I_{1\,n/2}^{(M)} - I_{1\,n/2}^{(M-1)} \\ I_{21}^{(M)} - I_{21}^{(M-1)} & I_{22}^{(M)} - I_{22}^{(M-1)} & \cdots & I_{2\,n/2}^{(M)} - I_{2\,n/2}^{(M-1)} \\ \vdots & \vdots & & \vdots \\ I_{m1}^{(M)} - I_{m1}^{(M-1)} & I_{m2}^{(M)} - I_{m2}^{(M-1)} & \cdots & I_{m\,n/2}^{(M)} - I_{m\,n/2}^{(M-1)} \end{bmatrix}$$

FIG. 11

$$F_{R,M} = \begin{bmatrix} r_{11}^{(M)} & r_{12}^{(M)} & \cdots & r_{1\,n/2}^{(M)} \\ r_{21}^{(2)} & r_{22}^{(M)} & \cdots & r_{2\,n/2}^{(M)} \\ \vdots & \vdots & & \vdots \\ r_{m1}^{(M)} & r_{m2}^{(M)} & \cdots & r_{m\,n/2}^{(M)} \end{bmatrix}$$

$$F_{R,N'} = \begin{bmatrix} r_{11}^{(M)} - r_{11}^{(M-1)} & r_{12}^{(M)} - r_{12}^{(M-1)} & \cdots & r_{1\,n/2}^{(M)} - r_{1\,n/2}^{(M-1)} \\ r_{21}^{(M)} - r_{21}^{(M-1)} & r_{22}^{(M)} - r_{22}^{(M-1)} & \cdots & r_{2\,n/2}^{(M)} - r_{2\,n/2}^{(M-1)} \\ \vdots & \vdots & & \vdots \\ r_{m1}^{(M)} - r_{m1}^{(M-1)} & r_{m2}^{(M)} - r_{m2}^{(M-1)} & \cdots & r_{m\,n/2}^{(M)} - r_{m\,n/2}^{(M-1)} \end{bmatrix}$$

FIG. 12

$$|F_{L,M}'| = \begin{bmatrix} |I_{11}^{(M)} - I_{11}^{(M-1)}| & |I_{12}^{(M)} - I_{12}^{(M-1)}| & \cdots & |I_{1\,n/2}^{(M)} - I_{1\,n/2}^{(M-1)}| \\ |I_{21}^{(M)} - I_{21}^{(M-1)}| & |I_{22}^{(M)} - I_{22}^{(M-1)}| & \cdots & |I_{2\,n/2}^{(M)} - I_{2\,n/2}^{(M-1)}| \\ \vdots & \vdots & \cdots & \vdots \\ |I_{m1}^{(M)} - I_{m1}^{(M-1)}| & |I_{m2}^{(M)} - I_{m2}^{(M-1)}| & \cdots & |I_{m\,n/2}^{(M)} - I_{m\,n/2}^{(M-1)}| \end{bmatrix} = \begin{bmatrix} |I_{11}|_N & |I_{12}|_N & \cdots & |I_{1\,n/2}|_N \\ |I_{21}|_N & |I_{22}|_N & \cdots & |I_{2\,n/2}|_N \\ \vdots & \vdots & \cdots & \vdots \\ |I_{m1}|_N & |I_{m2}|_N & \cdots & |I_{m\,n/2}|_N \end{bmatrix}$$

$$|F_{R,N}'| = \begin{bmatrix} |r_{11}^{(M)} - r_{11}^{(M-1)}| & |r_{12}^{(M)} - r_{12}^{(M-1)}| & \cdots & |r_{1\,n/2}^{(M)} - r_{1\,n/2}^{(M-1)}| \\ |r_{21}^{(M)} - r_{21}^{(M-1)}| & |r_{22}^{(M)} - r_{22}^{(M-1)}| & \cdots & |r_{2\,n/2}^{(M)} - r_{2\,n/2}^{(M-1)}| \\ \vdots & \vdots & \cdots & \vdots \\ |r_{m1}^{(M)} - r_{m1}^{(M-1)}| & |r_{m2}^{(M)} - r_{m2}^{(M-1)}| & \cdots & |r_{m\,n/2}^{(M)} - r_{m\,n/2}^{(M-1)}| \end{bmatrix} = \begin{bmatrix} |r_{11}|_N & |r_{12}|_N & \cdots & |r_{1\,n/2}|_N \\ |r_{21}|_N & |r_{22}|_N & \cdots & |r_{2\,n/2}|_N \\ \vdots & \vdots & \cdots & \vdots \\ |r_{m1}|_N & |r_{m2}|_N & \cdots & |r_{m\,n/2}|_N \end{bmatrix}$$

ELECTRONIC DEVICE AND METHOD FOR DETERMINING A STATE OF A DRIVER

PRIORITY

This application claims priority under 35 U.S.C. 119(a) to Korean Patent Application No. 10-2016-0143317 filed in the Korean Intellectual Property Office (KIPO) on Oct. 31, 2016, and U.S. Application No. 62/334,079 filed in the U.S. Patent and Trademark Office on May 10, 2016, the disclosure of which is incorporated herein by reference.

BACKGROUND

1. Field of the Disclosure

The present disclosure relates generally to an electronic device and a method for determining a state of a driver, and more particularly, to an electronic device for determining a state of a driver driving a moving object and a method for determining the state of the driver.

2. Description of Related Art

Vehicle accidents that are caused by driver drowsiness result in serious injuries every year. Accordingly, in order to prevent accidents caused by drowsy driving, various techniques for measuring and preventing a driver's drowsiness have been developed.

For example, one such method senses a driver's drowsiness by photographing a driver using a camera installed in a vehicle. However, the method is problematic in that the driver's drowsiness may not be accurately determined at night or may be affected by external factors such as sunglasses on the driver.

SUMMARY

The present disclosure has been made to address at least the above problems and/or disadvantages and to provide at least the advantages described below.

Accordingly, an aspect of the present disclosure provides an electronic device and a method for determining a state of a driver based on frequency characteristics with respect to a change in pressure applied by the driver.

According to an aspect of the present disclosure, an electronic device is provided that includes a sensor sensing a pressure applied, by a driver, to a seat of a moving object driven by the driver. The electronic device also includes a processor determining a state of the driver based on frequency characteristics with respect to a change in the pressure sensed by the sensor.

According to another aspect of the present disclosure, a method is provided for determining a state of a driver of an electronic device. A pressure applied, by a driver, to a seat of a moving object driven by the driver is sensed. A state of the driver is determined based on frequency characteristics with respect to a change in the pressure.

According to another aspect of the present disclosure, an electronic device is provided for detecting a state of a driver of a vehicle. The electronic device includes a sensor sensing pressures applied, by the driver, to regions of a seat of the vehicle. The electronic device also includes a processor calculating changes in the pressures, calculating at least one of magnitude characteristics and frequency characteristics of the changes, and determining the state of the driver based on the at least one of the magnitude characteristics and the frequency characteristics.

According to another aspect of the present disclosure, a method is provided for detecting a state of a driver of a vehicle. Pressures applied, by the driver, to regions of a seat of the vehicle are sensed. Changes in the pressures are calculated. At least one of magnitude characteristics and frequency characteristics of the changes are calculated. The state of the driver is determined based on the at least one of the magnitude characteristics and the frequency characteristics.

BRIEF DESCRIPTION OF THE DRAWINGS

The above and other aspects, features, and advantages of the present disclosure will be more apparent from the following detailed description when taken in conjunction with the accompanying drawings, in which:

FIGS. 4 to 8 are diagrams illustrating a method for sensing a state of a driver, according to an embodiment of the present disclosure;

FIGS. 10 to 14 are diagrams illustrating a method for sensing a gaze direction of a driver, according to an embodiment of the present disclosure;

DETAILED DESCRIPTION

Figure 1:
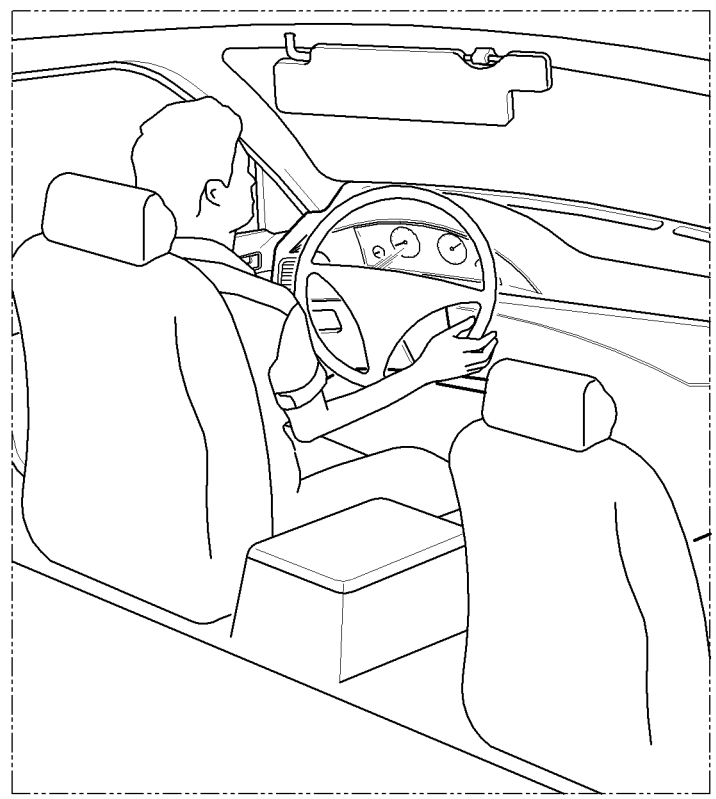
FIG. 1 is a diagram illustrating an implementation example of an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "first", "second", etc. may be used to describe diverse components, but the components are not limited by the terms. The terms are only used to distinguish one component from the others.

The terms used herein are only used to describe embodiments, and are not intended to limit the scope of the disclosure. A singular expression also includes the plural meaning as long as the context does not indicate otherwise. Herein, the terms "include" and "consist of" designate the presence of features, numbers, steps, operations, components, elements, or a combination thereof, but do not exclude the presence or possibility of one or more additional features, numbers, steps, operations, components, elements, or a combination thereof.

Herein, a module or a unit performs at least one function or operation, and may be implemented with hardware, software, or a combination of hardware and software. In addition, a plurality of modules or a plurality of units may be integrated into at least one module, except for a module or a unit that has to be implemented with specific hardware, and may be implemented with at least one processor.

FIG. 1 is a diagram illustrating an implementation of an electronic device, according to an embodiment of the present disclosure.

An electronic device 100 may be installed in a moving object. The moving object is shown as a vehicle in FIG. 1, but is only an example, and therefore may be a motorcycle, a train, an airplane, etc., that a driver may board and drive. The electronic device 100 may be fixedly provided in the moving object. Alternatively, the electronic device 100 may be detachably attached to the moving object.

The electronic device 100 may determine the state of the driver boarding the moving object. Specifically, the electronic device 100 may determine whether a driver sitting on a seat provided in the moving object, is sleeping, or the like.

The electronic device 100 may sense a magnitude of a pressure applied to a seat by a driver and analyze frequency components with respect to the change in the magnitude of the pressure, thereby determining the state of the driver.

As described above, according to an embodiment of the present disclosure, the electronic device 100 analyzes the frequency components with respect to the change in the magnitude of the pressure applied to the seat by the driver to determine the state of the driver in real time.

Figure 2:
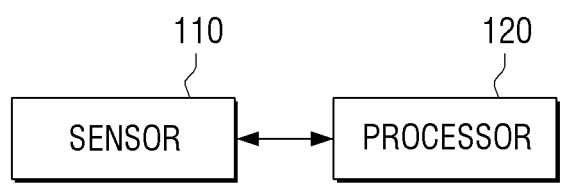
FIG. 2 is a block diagram illustrating a configuration of an electronic device, according to the embodiment of the present disclosure.

FIG. 2 is a block diagram illustrating a configuration of an electronic device, according to an embodiment of the present disclosure.

Referring to FIG. 2, the electronic apparatus 100 includes a sensor 110 and a processor 120.

The sensor 110 senses the pressure applied by the driver to the seat of the moving object. That is, the sensor 110 may sense the magnitude of the pressure applied by the driver to the seat of the moving object, and output pressure data indicating the sensed magnitudes of pressures.

The sensor 110 may include a plurality of piezoelectric sensors. That is, the plurality of piezoelectric sensors may sense the magnitude of the pressure applied by the driver to the seat of the moving object, and output the pressure data indicating the sensed magnitudes of the pressures.

Figure 3:
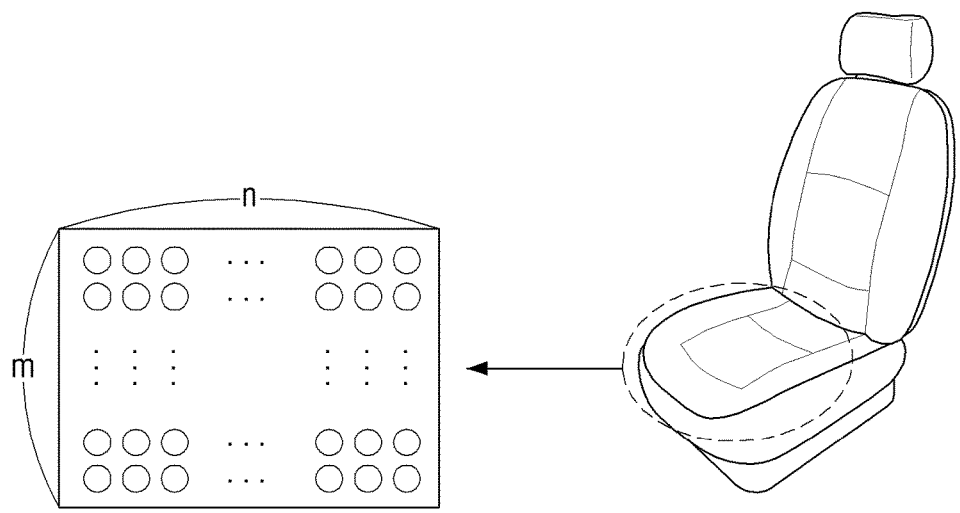
FIG. 3 is a diagram illustrating a disposition form of a piezoelectric sensor, according to an embodiment of the present disclosure.

FIG. 3 is a diagram illustrating a disposition form of a piezoelectric sensor, according to an embodiment of the present disclosure. The plurality of piezoelectric sensors may be arranged on a seat in a matrix array.

Referring to FIG. 3, m×n piezoelectric sensors may be arranged in the matrix array, at portions of the seat that the driver's hips contact when the driver sits on the seat. The piezoelectric sensors may be built in the seat, or may also be arranged in the seat while being separately provided in a cushion. Additionally, the piezoelectric sensor may be installed in a backrest portion of the seat in addition to the portions that contact the driver's hips.

When the piezoelectric sensors are arranged in the matrix array, the number of piezoelectric sensors arranged in each column and the number of piezoelectric sensors arranged in each row may be the same or different, and may be changed depending on a size and a shape of the seat.

Additionally, the piezoelectric sensor may be arranged in various arrays, such as, for example, a circle.

Referring back to FIG. 2, the sensor 110 may sense the pressure at a preset time interval.

Specifically, the preset time interval may be 1/T second (i.e., T Hz). The sensor 110 may sense the magnitudes of the pressures applied by the driver at intervals of 1/T seconds using the plurality of piezoelectric sensors, and output pressure data indicating the sensed magnitudes of the pressures. Here, T may be 50. That is, the sensor 110 may sense the pressure at intervals of 1/50 seconds and output the pressure data.

Since the pressure is sensed by the plurality of piezoelectric sensors, the pressure data sensed by the plurality of piezoelectric sensors at a specific time may constitute one frame.

The frame may include the pressure data sensed by the plurality of piezoelectric sensors at the same time. Further, since the plurality of piezoelectric sensors are arranged in the matrix array, even in the frame, the pressure data sensed by each piezoelectric sensor, according to positions of the plurality of piezoelectric sensors, may be included in the matrix array.

For example, the sensor 110 may sense the pressure using the plurality of piezoelectric sensors every 1/T second, and sequentially output the frame including the plurality of sensed pressure data (outputs T frames per second).

As illustrated in FIG. 4, the sensor 110 may sequentially output a first frame $F_1$ including pressure data $a_{11}^{(1)}$, $a_{12}^{(1)}$, ..., $a_{mn}^{(1)}$ sensed by the plurality of piezoelectric sensors at 1/T seconds, a second frame $F_2$ including the pressure data $a_{11}^{(2)}$, $a_{12}^{(2)}$, ..., $a_{mn}^{(2)}$ sensed by the plurality of piezoelectric sensors at 2/T seconds, a third frame $F_3$ including pressure data $a_{11}^{(3)}$, $a_{12}^{(3)}$, ..., $a_{mn}^{(3)}$ sensed by the plurality of piezoelectric sensors at 3/T seconds, etc.

As described above, the sensor 110 may output an M-th frame $F_M$ including the pressure data $a_{11}^{(M)}$, $a_{12}^{(M)}$, ..., $a_{mn}^{(M)}$ sensed by the plurality of piezoelectric sensors at M/T seconds.

As illustrated in FIG. 4, subscripts of the pressure data indicate the positions of the piezoelectric sensors.

That is, in the matrix, the pressure data sensed by the piezoelectric sensor arranged in a first column of a first row is $a_{11}$, the pressure data sensed by the piezoelectric sensor arranged in a second column of the first row is $a_{12}$, ..., and the pressure data sensed by the piezoelectric sensor arranged in an n-th column of an m-th row is $a_{mn}$.

In the example described above, the pressure is sensed by T Hz, however, the sensor 110 may sense the pressure within a range of 1 to T Hz.

The processor 120 controls an overall operation of the electronic device 100. The processor 120 includes a central processing unit (CPU), a random access memory (RAM), and a read only memory (ROM), and may execute operations or data processing relating to control of other components included in the electronic device 100.

The processor 120 may control the sensor 110 to sense the pressure applied by the driver to the seat of the moving object to receive the pressure data output from the sensor 110.

In this case, the processor 120 may control the sensor 110 to sense the pressure at the preset time interval.

Accordingly, the sensor 110 may sense the pressure applied by the driver to the seat of the moving object at the preset time interval using the plurality of piezoelectric sensors, and sequentially output the plurality of pressure data sensed at each timing to the processor 120 in a frame unit.

The processor 120 determines the state of the driver on the basis of frequency characteristics with respect to the change in the pressure sensed by the sensor 110.

Specifically, the processor 120 may calculate a difference in the sensed magnitude of the pressure at the preset time interval, and analyze the frequency components of the calculated difference values to determine the state of the driver.

The state of the driver may include a drowsy state, a driving state (i.e., moving a driver's foot to step on a brake pedal and an accelerator pedal or moving a driver's hand to manipulate a handle), and a motion state (for example, motion to manipulate navigation while driving) for purposes other than driving.

If the pressure data is input from the sensor 110 in a frame unit, the processor 120 may calculate a difference value in the pressure data between frames.

Specifically, the processor 120 may calculate the difference value between the pressure data included in a frame and a previous frame. That is, the processor 120 may calculate a difference value between the pressure data included in an M-th frame $F_M$ and an M−1-th frame $F_{M-1}$.

The processor 120 may calculate the difference value between the pressure data sensed by the piezoelectric sensors at the same position to calculate the difference value between the pressure data included in the frame and the previous frame.

For example, as illustrated in FIG. 5, the processor 120 may subtract pressure data included in a first frame $F_1$ from pressure data included in a second frame $F_2$ to calculate a differential frame $F_1'$ ($=F_2-F_1$) that includes a difference value between the second frame $F_2$ and the first frame $F_1$.

In this case, the processor 120 calculates the difference value between the pressure data sensed by the piezoelectric sensors at the same position in each frame.

As illustrated in FIG. 5, since the second frame $F_2$ includes pressure data $a_{11}^{(2)}$, $a_{12}^{(2)}$, ..., $a_{mn}^{(2)}$ sensed by m×n piezoelectric sensors and the first frame $F_1$ includes pressure data $a_{11}^{(1)}$, $a_{12}^{(1)}$, ..., $a_{mn}^{(1)}$ sensed by the m×n piezoelectric sensors, a plurality of elements constituting the difference frame $F_1'$ are the same as $a_{11}^{(2)}-a_{11}^{(1)}$, $a_{12}^{(2)}-a_{12}^{(1)}$, ..., $a_{mn}^{(2)}-a_{mn}^{(1)}$.

Further, the processor 120 may subtract the pressure data included in the second frame $F_2$ from pressure data included in a third frame $F_3$ to calculate a difference frame $F_2'$ ($=F_3-F_2$) including a difference value between the third frame $F_3$ and the second frame $F_2$.

In this case, the plurality of elements constituting the difference frame $F_2'$ are the same as $a_{11}^{(3)}-a_{11}^{(2)}$, $a_{12}^{(3)}-a_{12}^{(2)}$, ..., $a_{mn}^{(3)}-a_{mn}^{(2)}$.

As described above, the processor 120 may subtract pressure data included in an M−1-th frame $F_{M-1}$ from the pressure data included in the M-th frame $F_M$ to calculate a difference frame $F_N'$ ($=F_M-F_{M-1}$) including a difference value between the M-th frame and the M−1-th frame $F_{M-1}$.

In this case, the plurality of elements constituting the difference frame $F_N'$ are the same as $a_{11}^{(M)}-a_{11}^{(M-1)}$, $a_{12}^{(M)}-a_{12}^{(M-1)}$, ..., $a_{mn}^{(M)}-a_{mn}^{(M-1)}$.

Calculating the difference value between the frames, as described above, removes noise of a low frequency component to more accurately sense the state according to the motion of the driver.

Thereafter, the processor 120 may take absolute values for the difference values of the pressure data between the frames and sum up the absolute values.

That is, the processor 120 may take absolute values for each of the plurality of elements constituting the difference frame and may add up the plurality of elements for which the absolute value is taken. In this case, the summed value may be viewed as a representative value for the difference frame.

For example, as illustrated in FIG. 6, the processor 120 may take an absolute value for the difference frame $F_1'$ and sum a plurality of elements of the difference frame $|F_1'|$ for which the absolute value is taken to calculate a representative value $P_1(=|f_{11}|_1+|f_{12}|_1+ \ldots +|f_{mn}|_1)$ for the difference frame $F_1'$.

Further, the processor 120 may take an absolute value for the difference frame $F_2'$ and sum a plurality of elements of the difference frame $|F_2'|$ for which the absolute value is taken to calculate a representative value $P_2(=|f_{11}|_2+|f_{12}|_2+ \ldots +|f_{mn}|_2)$ for the difference frame $F_2'$.

As described above, the processor 120 may take an absolute value for the difference frame $F_N'$ and sum a plurality of elements of the difference frame $|F_N'|$ for which the absolute value is taken to calculate a representative value $P_N(=|f_{11}|_N+|f_{12}|_N+ \ldots +|f_{mn}|_N)$ for the difference frame $F_N'$.

That is, the processor 120 may calculate the representative value $P_N$ based on Equation (1) below.

$$P_N = \sum_{i,j=1}^{i=m, j=n} |f_{i,j}|_N = |f_{11}|_N + |f_{12}|_N + \ldots + |f_{mn}|_N \tag{1}$$

In the example described above, the absolute value is taken for the difference value in the pressure data between the frames, however, the difference value in the pressure data between the frames may be squared or a root mean square (RMS) may be applied.

The processor 120 may square the representative value $P_N$ for the difference frame. A value obtained by squaring the representative value $P_N$ may be viewed as power (or energy) for the representative value $P_N$. As described above, the reason for squaring the representative value $P_N$ is to clarify a difference between signals in order to determine the state of the driver.

Figure 7:
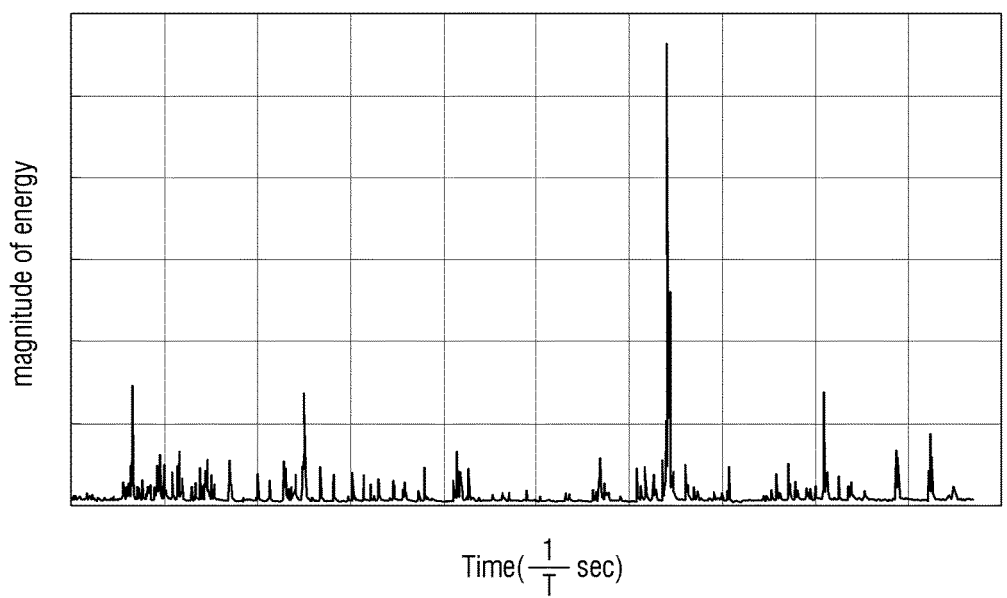

If the representative value $P_N$ is squared and represented by a graph, the representative value $P_N$ may be represented by a signal (or a waveform) as illustrated in FIG. 7, for example. In FIG. 7, an x axis represents time, and a y axis represents the magnitude of the value (i.e., power) obtained by squaring the representative value $P_N$.

The processor 120 may determine the state of the driver based on the signal indicating the power for the representative value $P_N$.

Since the representative value is the value obtained by summing the plurality of elements of the difference frame, the representative value can be viewed as the difference value in the pressure data between the frames. As a result, the difference in the magnitude of the pressure between the frames, that is, the difference in the magnitude of the pressure applied to the seat over time, may be viewed as the representative value. Therefore, analyzing the signal represented based on the representative value can be viewed as analyzing the signal indicating the difference in the magnitude of the pressure.

Since a motion of a driver's body for purposes other than driving is an arbitrary motion, the motion is big, and accordingly the pressure applied to the seat is greatly changed over time.

Figure 8:
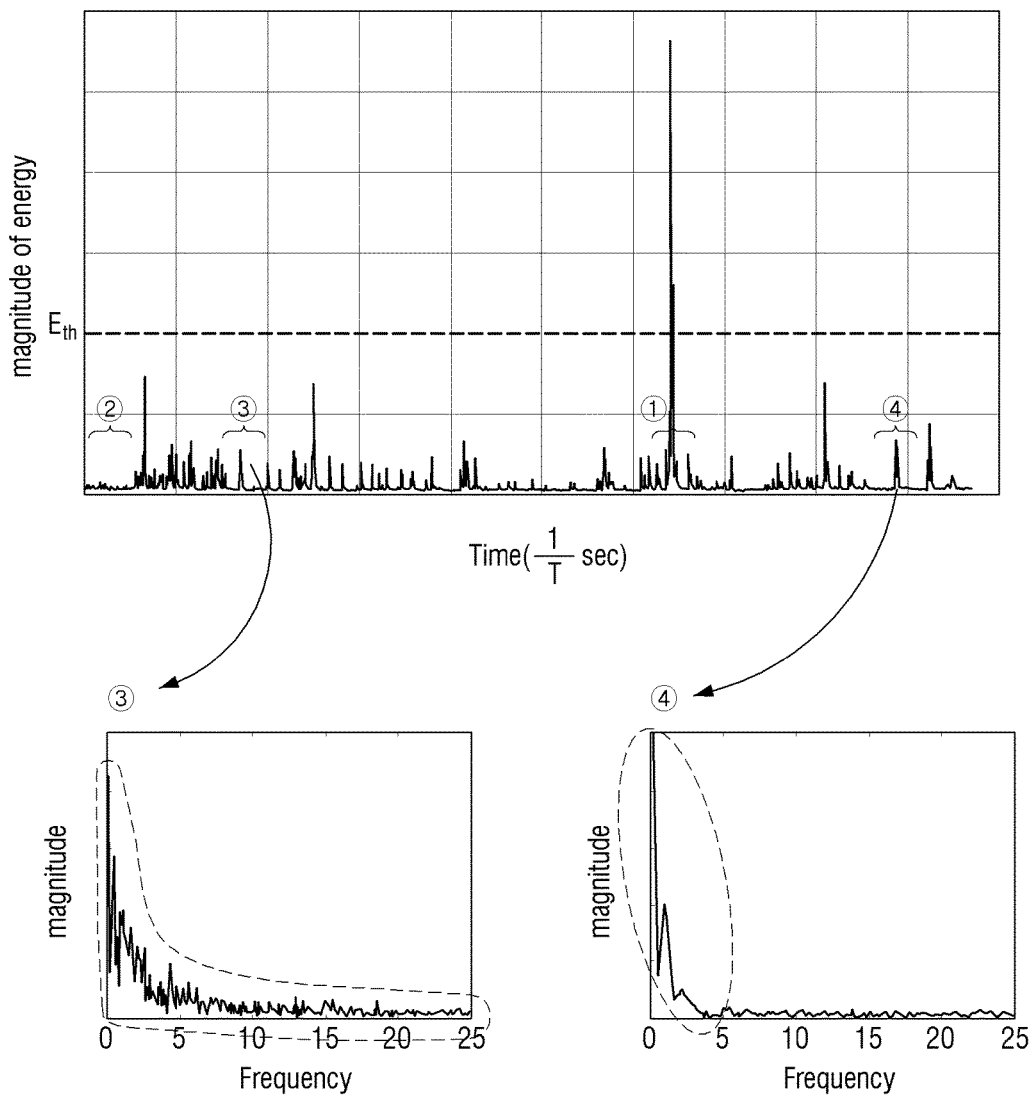

Therefore, as illustrated with respect to ① of FIG. 8, when the signal indicating the power for the representative value $P_N$ has a magnitude that is greater than or equal to a preset threshold value $E_{th}$, the processor 120 may determine that the driver's body is moving for purposes other than driving in a time period of the signal.

During a time period when the magnitude of the signal indicating the power for the representative value $P_N$ is small (for example, the magnitude of the signal indicating the power is a period approximating zero), the time period shows little difference in the magnitude of the pressure applied to the seat by the driver, and therefore, it can be viewed that there is no motion of the driver in the corresponding time period.

Accordingly, as illustrated with respect to ② of FIG. 8, the processor 120 may determine that there is almost no motion of the driver in the corresponding time period.

When the driver moves to drive the moving object (i.e., a driving motion) and when the driver moves while sleeping (i.e., drowsiness motion), the motion of the driver is not of a significant magnitude.

Accordingly, when the driver is driving or sleeping, the power based on the change in the magnitude of the pressure applied to the seat is smaller than the preset threshold value but is larger than the case in which the driver does not move.

However, in these cases, the magnitudes of the motions are similar, and therefore, they are difficult to distinguish using only the change in the magnitude of the pressure over time.

Accordingly, the processor 120 may perform a frequency conversion on the signal indicating the power for the representative value $P_N$ to determine the state of the driver and analyze the frequency components of the signal. The processor 120 may perform a frequency conversion on the signal indicating the power for the representative value $P_N$ in real time to analyze the frequency components of the signal.

Specifically, the processor 120 may perform the frequency conversion on the signals included in each of the preset time periods to analyze the frequency components of the signals included in each of the time periods.

Here, the preset time period may be equal to a time interval in which the sensor 110 senses the pressure.

For example, when the sensor 110 senses the pressure at intervals of 1/T seconds, the processor 120 may perform Fourier transform on signals included in a time period of an interval of 1/T second, that is, a signal at 0 to 1/T seconds, a signal at 1/T to 2/T seconds, a signal at 2/T to 3/T seconds, . . . , to analyze the frequency components for each signal included in the time period of the interval of 1/T seconds.

Further, the processor 120 may determine the state of the driver based on the frequency components of each signal.

Specifically, the driver manipulates the handle with the hand to drive the moving object, and performs motions such as stepping on a pedal with the foot. In this way, when the driver is driving the moving object, the driver moves in various manners using various muscles of the body, and therefore the signal based on the change in the magnitude of the pressure applied to the seat while the driver drives the moving object may consist of various frequency components, that is, frequency components from a low frequency component to a high frequency component.

On the other hand, since the driver performs simple motions such as slowly or instantly leaning head forward while sleeping, the change in the magnitude of the pressure applied to the seat while the driver is sleeping may consist of a specific range of frequency components. Here, a specific range of frequency components may be a low frequency component.

Therefore, the processor 120 may determine that the driver is driving the moving object in the time period in which the high frequency component and the low frequency component are detected, and may determine that the driver is sleeping in the time period in which the low frequency component are detected, as the result of analyzing the frequency components in each time period.

For example, referring again to FIG. 8, in a time period ③ having a frequency component of 1 to 25 Hz, the driver may be categorized as driving the moving object, and a time period ④ having a frequency component of 1 to 5 Hz, the driver may be categorized as sleeping.

The processor 120 may determine that the driver is in a drowsy state in a time period in which the frequency components for the difference in the magnitude of the pressure consist of a low frequency component, and may determine that the driver is driving the moving object in a time period in which the frequency components for the difference in the magnitude of the pressure consist of a high frequency component and a low frequency component.

Specifically, the processor 120 may represent the difference values calculated at a preset time interval as signals on a time basis, perform the frequency conversion on signals in each of the preset time intervals to determine frequency components of the signals in each time interval, and determine that the driver is in a drowsy state in the time period in which a low frequency component having the preset threshold value or less is detected. In addition, the processor 120 may determine that the driver is driving the moving object in a time period in which the high frequency component and the low frequency component, which are less than or equal to the preset threshold value, are detected.

If the sensor 110 senses the pressure using the plurality of piezoelectric sensors, the processor 120 may determine the state of the driver in real time by calculating the change in the magnitude in the pressure sensed at the preset time interval in real time, and analyzing the frequency components for the calculated difference in the magnitude of the pressure.

As described above, the low frequency component of 1 to 5 Hz and the high frequency component of 5 to 25 Hz are exemplary only.

Specifically, the processor 120 may determine that the driver is driving the moving object in a time period in which the low frequency component of 0.5 to 5 Hz and the high frequency component of 5 to 50 Hz are detected together, and may determine that the driver is sleeping in a time period in which the low frequency component of 0.5 to 5 Hz is detected.

Further, when determining the state of the driver, the processor may determine the state of the driver regardless of a driver's weight in that a difference in the magnitude of the pressure applied to the seat is used.

As described above, the processor 120 may determine that the driver is in a drowsy state in a time period in which the frequency components for the difference in the magnitude of the pressure consist of the low frequency component.

Here, the time period consisting of the low frequency component may not only include the time period consisting of only the low frequency component, but also include the time period in which the high frequency component is present a bit together with the low frequency component but the magnitude of the high frequency component is very small.

As described above, the state of the driver is determined based on frequency characteristics, but this is exemplary only.

For example, the processor 120 may determine the state of the driver based on a change in the magnitude of the pressure calculated for a specific time period, and not based on a change in the magnitude of the pressure calculated in real time.

That is, the processor 120 may also determine the state of the driver based on the signal indicating the power for the representative value for the specific time.

Specifically, the processor 120 may detect a peak in the signal representing the power for the representative value for the specific time period. In this case, a peak detection algorithm may be used for the peak detection.

Further, the processor 120 may determine the time period in which there is no motion of the driver for the specific time period and the time period in which the driver moves his/her body for purposes other than driving, based on the magnitude of the power for the representative value.

That is, the processor 120 may determine that there is no motion of the driver in a time period in which the magnitude of the signal indicating the power for the representative value is small, and may determine that the driver moves his/her body for purposes other than driving in a time period having a magnitude greater than or equal to the threshold value, among the specific time periods.

For example, as shown in FIG. 8, the processor 120 may determine that there is no motion of the driver in the time period in which the magnitude of the signal indicating the power for the representative value has a magnitude less than or equal to a threshold value $P_t$, that is, the time period ②, in which the magnitude of the signal approximates 0, and may determine that the driver moves his/her body for other purposes other than driving in the time period ①, in which the magnitude of the signal is greater than or equal to the preset threshold value $E_{th}$.

The processor 120 may calculate a time interval between the detected peaks. In this case, a peak-to-peak detection algorithm may be used. Further, the processor 120 may integrate a peak signal corresponding to the peak to calculate an area of the peak signal.

Here, the fact that the time interval for other peaks is relatively smaller and the area of the peak signal is relatively larger means that the driver makes various motions relatively slower, and the fact that the time interval for other peaks is relatively larger and the area of the peak signal is relatively smaller means that the driver momentarily performs a simple motion.

Therefore, the processor 120 may determine that the driver is driving the moving object in the time period in which there is a peak signal having a shorter time interval and a larger area compared to other peaks, and may determine that the driver is sleeping in the time period in which there is a peak signal having a longer time interval and a smaller area compared to other peaks, among the specific time periods.

As described above, the interval between the peaks is considered in order to determine the state of the driver, and therefore, is based on the change in the magnitude of the pressure calculated for a specific time rather than in real time.

The processor 120 may provide feedback corresponding to the state of the driver.

Specifically, if it is determined that the driver is in a drowsy state, the processor 120 can decrease the speed of the moving object.

For example, if it is determined that the driver is in a drowsy state, the processor 120 may gradually decrease the speed of the moving body to a preset speed or may stop the moving body.

Further, if it is determined that the driver is in a drowsy state, the processor 120 may also output a preset audio.

For example, if it is determined that the driver is in a drowsy state, the processor 120 may output a warning sound of a specific sound through a speaker equipped in the moving object or output a voice for guiding that the driver is currently sleeping.

Further, if it is determined that the driver is in a drowsy state, the processor 120 may also display specific information on a display.

For example, if it is determined that the driver is in a drowsy state, the processor 120 may output a warning message to a front window of the moving object or output a message for guiding that the driver is currently sleeping.

For example, if the processor 120 determines that the driver is in a drowsy state, the moving object may automatically switch a driving mode to an autonomous driving mode.

The processor 120 may determine a gaze direction of a driver based on the change in the magnitude of the pressure.

Figure 9:
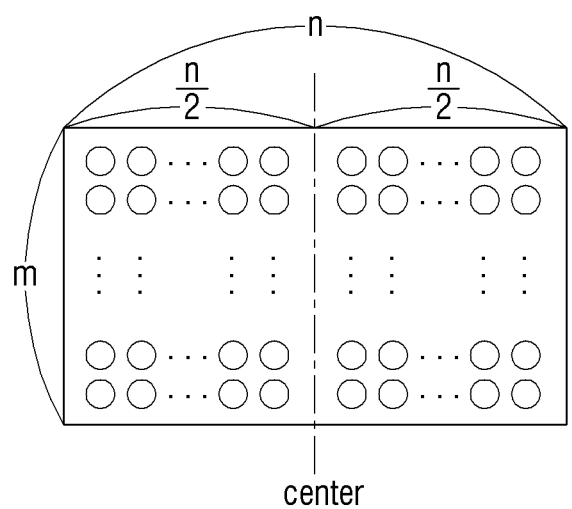
FIG. 9 is a diagram illustrating a configuration of an electronic device, according to an embodiment of the present disclosure.

For this purpose, the sensor 110 may include a plurality of piezoelectric sensors disposed on the left side with respect to a center of a matrix and a plurality of piezoelectric sensors disposed on the right side with respect to the matrix. For example, as illustrated in FIG. 9, m×n/2 piezoelectric sensors may be arranged on the left and right sides, respectively, with respect to the center of the matrix.

The plurality of piezoelectric sensors disposed on the left and right sides may sense the pressure applied by the driver at preset time intervals and sequentially output a plurality of pressure data sensed at each timing to the processor 120 in a frame unit.

Further, the processor 120 may determine the gaze direction of the driver based on the change in the magnitude of the pressure sensed by the left piezoelectric sensor and the change in the magnitude of the pressure sensed by the right piezoelectric sensor.

The processor 120 may calculate the change in the magnitude of the pressure sensed by the left piezoelectric sensor and the change in the magnitude of the pressure sensed by the right piezoelectric sensor.

Specifically, if the pressure data are input from the left piezoelectric sensor in the frame unit, the processor 120 may calculate the difference value between the pressure data included in a frame and a previous frame. Further, if the pressure data are input from the right piezoelectric sensor in the frame unit, the processor 120 may calculate the difference value between the pressure data included in a frame and a previous frame.

Here, the method for calculating a difference value in pressure data between frames only differs in the number of pressure sensors, and is the same as the method described above with reference to FIGS. 4 and 5.

For example, as illustrated in FIG. 10, the plurality of left piezoelectric sensors may output an M-th frame $F_{L,M}$ including pressure data $l_{11}^{(M)}, l_{12}^{(M)}, \ldots, l_{mn/2}^{(M)}$ sensed at M/T seconds, and the processor 120 may subtract pressure data included in an M−1-th frame $F_{L,M-1}$ from the pressure data included in the M-th frame $F_{L,M}$ to calculate a difference frame $F_{L,N}'$ ($=F_{L,M}-F_{L,M-1}$) including a difference value between the M-th frame $F_{L,M}$ and the M−1-th frame $F_{L,M-1}$.

A plurality of elements constituting the difference frame $F_{L,N}'$ are the same as $l_{11}^{(M)}-l_{11}^{(M-1)}, l_{12}^{(M)}-l_{12}^{(M-1)}, \ldots, l_{mn/2}^{(M)}-l_{mn/2}^{(M-1)}$.

Further, as illustrated in FIG. 11, the plurality of right piezoelectric sensors may output an M-th frame $F_{R,M}$ including pressure data $r_{11}^{(M)}, r_{12}^{(M)}, \ldots, r_{mn/2}^{(M)}$ sensed at M/T seconds, and the processor 120 may subtract pressure data included in an M−1-th frame $F_{R,M-1}$ from the pressure data included in the M-th frame $F_{R,M}$ to calculate a difference frame $F_{R,N}'$ ($=F_{R,M}-F_{R,M-1}$) including a difference value between the M-th frame $F_{R,M}$ and the M−1-th frame $F_{R,M-1}$.

A plurality of elements constituting the difference frame $F_{R,N}'$ are the same as $r_{11}^{(M)}-r_{11}^{(M-1)}$, $r_{12}^{(M)}-r_{12}^{(M-1)}$, ..., $r_{mn/2}^{(M)}-r_{mn/2}^{(M-1)}$.

Thereafter, the processor 120 may take absolute values for the difference values of the pressure data between the frames, and sum the absolute values.

That is, the processor 120 may take absolute values for each of the plurality of elements constituting the difference frame and may add up the plurality of elements for which the absolute value is taken. In this case, the summed value may be viewed as a representative value (or pressure change value) for the difference frame.

For example, as illustrated in FIG. 12, the processor 120 may take an absolute value for the difference frame $F_{L,N}'$ and sum a plurality of elements of the difference frame $|F_{L,N}'|$ for which the absolute value is taken to calculate a representative value $P_{L,N}(=|l_{11}|_N+|l_{12}|_N+\ldots+|l_{mn/2}|_N)$ for the difference frame $F_{L,N}'$.

Further, the processor 120 may take an absolute value for the difference frame $F_{R,N}'$ and sum a plurality of elements of the difference frame $|F_{R,N}'|$ for which the absolute value is taken to calculate a representative value $P_{R,N}(=|r_{11}|_N+|r_{12}|_N+\ldots+|r_{mn/2}|_N)$ for the difference frame $F_{R,N}'$.

The processor 120 may calculate the representative values $P_{L,N}$ and $P_{R,N}$ based on Equations (2) and (3) below.

$$P_{L,N} = \sum_{i,j=1}^{i=m,j=n/2} |l_{i,j}|_N = |l_{11}|_N + |l_{12}|_N + \ldots + |l_{mn/2}|_N \quad (2)$$

$$P_{R,N} = \sum_{i,j=1}^{i=m,j=n/2} |r_{i,j}|_N = |r_{11}|_N + |r_{12}|_N + \ldots + |r_{mn/2}|_N \quad (3)$$

The processor 120 may calculate the difference between the representative value of the left difference frame and the representative value for the right difference frame.

Specifically, the processor 120 may subtract the representative value $P_{L,N}$ for the right difference frame from the representative value $P_{R,N}$ for the right difference frame to calculate a difference value (i.e., $P_{L,N}-P_{R,N}$) between the representative values.

Figure 13:
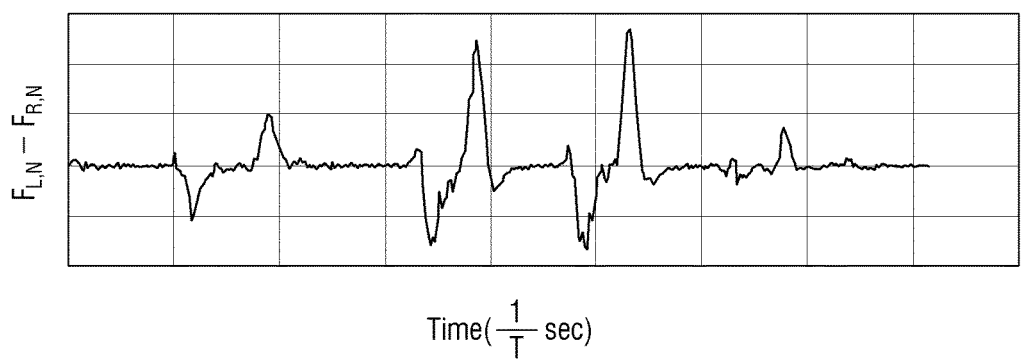

If the difference value $P_{L,N}-P_{R,N}$ between the representative values is represented by a graph, for example, it may be represented by signals as illustrated in FIG. 13. In FIG. 13, an x axis represents time and a y axis represents the magnitude of the difference value between the representative values.

The processor 120 may determine the gaze direction of the driver based on the signal indicating the difference value $P_{L,N}-P_{R,N}$ between the representative values.

Specifically, when the driver looks at the left side while sitting on the seat, a relatively larger pressure is applied to a left region than the right region of the seat, and when the driver looks at the right side while sitting on the seat, a relatively larger pressure is applied to the right region than the left region of the seat.

Accordingly, the processor 120 may determine that the gaze direction of the driver is directed to the left in the time period in which the difference value $P_{L,N}-P_{R,N}$ between the representative values is positive, and may determine that the gaze direction of the driver is directed to the right in the time period in which the difference value $P_{L,N}-P_{R,N}$ between the representative values is negative.

Figure 14:
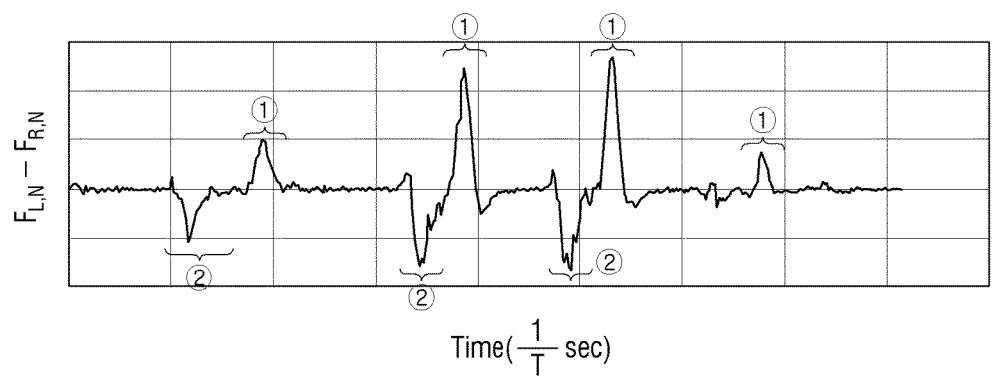

For example, as shown in FIG. 14, the processor 120 may determine that the gaze direction of the driver is directed to the left in time periods ① in which the difference value $P_{L,N}-P_{R,N}$ between the representative values is positive, and may determine that the gaze direction of the driver is directed to the right in time periods ② in which the difference value $P_{L,N}-P_{R,N}$ between the representative values is negative.

In addition, the processor 120 may determine the degree to which the gaze direction of the driver is directed to the left or right with respect to a front face, depending on the magnitude of the difference value $P_{L,N}-P_{R,N}$ between representative values.

Specifically, as the driver sitting in the seat directs his or her gaze to the left, a gradually increasing pressure is applied to the left region of the seat, and as the driver sitting in the seat directs his or her gaze to the right, a gradually increasing pressure is applied to the right region of the seat.

Accordingly, when the magnitude of the difference value $P_{L,N}-P_{R,N}$ between the representative values is positive, the processor 120 may determine that as the magnitude of the difference value increases, the relative magnitude of the gaze direction of the driver to the left with respect the front face also increases. Further, when the magnitude of the difference value $P_{L,N}-P_{R,N}$ between the representative values is negative, the processor 120 may determine that as the magnitude of the difference value increases, the relative magnitude of the gaze direction of the driver to the right with respect the front face also increases.

As described above, the representative value $P_{R,N}$ for the right difference frame is subtracted from the representative value $P_{L,N}$ for the left difference frame; however, this is only an example.

The processor 120 may subtract the representative value $P_{L,N}$ for the left difference frame from the representative value $P_{R,N}$ for the right difference frame.

The processor 120 may determine that the gaze direction of the driver is directed to the right in the time period in which the difference value $P_{R,N}-P_{L,N}$ between the representative values are positive, and may determine that the gaze direction of the driver is directed to the left in the time period in which the difference value $P_{R,N}-P_{L,N}$ between the representative values is negative.

Meanwhile, the processor 120 can output information according to the gaze direction of the driver.

For example, the processor 120 may display the information in the left region of the front window with respect to the seat when the gaze direction of the driver is directed to the left, and may display the information in the right region of the front window with respect to the seat when the gaze direction of the driver is directed to the right.

The processor 120 may determine a position to which the information is output according to the degree of the gaze direction of the driver.

For example, the processor 120 may display information in a region located further to the left as the gaze direction of the driver is directed to the left, and may display information in a region located further to the right as the gaze direction of the driver is directed to the right.

Further, the processor 120 may provide various pieces of feedback according to the degree of the gaze direction of the driver.

For example, the processor 120 may output a message warning of distracted driving or inducing a forward gaze to a window of a moving object, or may output a warning sound through a speaker, when the gaze direction of the driver is directed to the left or right.

Further, the processor 120 may determine whether an object exists around the moving object through an additional sensor equipped in the moving object, for example, a camera or a proximity sensor, and may provide feedback corresponding to the case in which a driver turns his/her head while an object exists around the moving object to look at the left or right.

For example, when the driver turns his or her head to the left or right in while an object exists around a moving object, the processor 120 may activate a camera for photographing a dead zone or output, through the speaker, an alarm sound corresponding to the case in which it is determined by the activated camera that an object exists in the dead zone.

Further, the processor 120 may take into consideration both the gaze direction of the driver and the movement direction of the moving object to provide feedback corresponding thereto.

For example, the processor 120 may sense that a moving object moves to a left lane and may sense that the gaze direction of the driver is directed to the right. That is, when it is determined that the gaze of the driver is directed in a direction opposite to the moving direction of the vehicle, the warning sound may be output through the speaker or a warning may be displayed on the window of the moving object.

As described above, the processor 120 determines the gaze direction of the driver based on the difference between the representative value for the left difference frame and the representative value for the right difference frame, however, this is only an example.

As another example, the processor 120 compares the magnitude of the pressure sensed by the left piezoelectric sensor with the magnitude of the pressure sensed by the right piezoelectric sensor to determine whether a center of gravity of the driver exists in the left or right region, and determines the gaze direction of the driver depending on the region in which the center of gravity exists.

Specifically, when the magnitude of the pressure sensed by the left piezoelectric sensor is larger than that sensed by the right piezoelectric sensor, the processor 120 may determine that the center of gravity of the driver exists in the left region. The processor 120 may then determine that the gaze direction of the driver is directed to the left.

Further, when the magnitude of the pressure sensed by the right piezoelectric sensor is larger than that sensed by the left piezoelectric sensor, the processor 120 may determine that the center of gravity of the driver exists in the right region. The processor 120 may then determine that the gaze direction of the driver is directed to the right.

Meanwhile, the processor 120 may determine whether the center of gravity of the driver is biased to one side while the driver moves significantly based on the pressure data, and may provide feedback corresponding thereto.

Specifically, when the driver moves significantly and at the same time the center of gravity of the driver is biased to one side, the pressure applied to the seat is greatly changed over time and the pressure applied to the specific region is larger than that applied to other regions. Accordingly, the processor 120 may determine the state of the driver based on the pressure data and provide feedback corresponding thereto.

For example, when a driver leans his/her body to the right for purposes other than driving (e.g., to open a console box), the pressure applied to the seat changes greatly over time and the center of gravity of the driver exists in the right area.

The processor 120 may output a message warning of distracted driving to the window of the moving object, or may output a warning sound for distracted driving through the speaker.

Further, the processor 120 may determine, based on pressure data, whether or not a state in which the driver does not move much but the center of gravity of the driver is biased to one side and does not return to the original state is maintained for a preset time, and may also provide feedback corresponding thereto.

Specifically, when the driver does not move much but the center of gravity is present at one side for a preset time, the pressure applied to the seat is not greatly changed over time and the pressure applied to the specific region for the preset time is larger than that applied to other regions. Accordingly, the processor 120 may determine the state of the driver based on the pressure data and provide feedback corresponding thereto.

For example, when the driver turns his/her head and talks to a person sitting on the right seat or looking at a navigation installed on the right side with respect to a driver's seat, the pressure applied to the seat is not greatly changed but the center of gravity of the driver exists in the right region for a predetermined time.

The processor 120 may output a message warning of a forward gaze to the window of the moving object, or may output a warning sound through the speaker.

In addition, the processor 120 may determine, based on the pressure data, whether the center of gravity of the driver is maintained for the preset time in the state in which the center of gravity of the driver moves to one side, and may provide feedback corresponding thereto.

Specifically, when the center of gravity of the driver is maintained for a preset time in the state in which it moves to one side while the driver is driving, a frequency with respect to the change in the magnitude of the pressure applied to the seat has a low frequency component and a high frequency component. In this state, the pressure applied to the specific region for the preset time is relatively larger than that applied to other regions. Accordingly, the processor 120 may determine the state of the driver based on the pressure data, and may provide feedback corresponding thereto.

For example, when a driver picks up a mobile phone while driving and carries out a call, the center of gravity is biased to one side for a predetermined time.

In this case, the processor 120 may output a message warning of a manipulation of a mobile phone to the window of the moving object, or may output a warning sound for distracting driving through the speaker.

The pressure applied to the seat may be used to determine whether or not the mobile phone is manipulated. In addition, the processor 120 may determine whether or not the driver's voice is received through a microphone installed in the mobile object to determine that the driver picks up the mobile phone while driving and performs a call, when the center of gravity of the driver moves and the driver's voice is received through the microphone.

The processor 120 may divide the region into four regions (i.e., an upper right region, an upper left region, a lower right region, and a lower left region with respect to the center) with respect to the plurality of piezoelectric sensors arranged in the matrix array. The processor 120 may also determine a region in which the center of gravity of the driver exists among the four regions based on the difference values of the pressures detected in each region.

The processor 120 may determine, as the region in which the center of gravity of the driver exists, the region in which the magnitude of the detected pressure is larger than that of the other regions.

Therefore, the processor 120 may provide various pieces of feedback according to the region in which the center of gravity of the driver exists.

For example, if the driver picks up something that falls under his or her foot, the driver's center of gravity exists in the upper region.

Accordingly, when the center of gravity of the driver exists in the upper region, the processor 120 may determine that the driver takes an action of picking up something falling under his/her foot, may provide a warning of distracted driving, may output a message warning of distracted driving or inducing the forward gaze to the window of the moving object, or may output a warning sound through the speaker.

As another example, when the driver turns his head to the back left or right to talk to a person sitting on the back left seat or the back right seat, or when the driver takes an action of picking something up on the back seat, the center of gravity of the driver exists in the lower left region or the lower right region.

Accordingly, when the center of gravity of the driver exists in the lower left region or the lower right region, the processor 120 may determine that the driver takes an action of talking to a person sitting on the back seat or picking up something on the back seat, may warn of distracted driving, may output a message warning of distracted driving or inducing the forward gaze to the window of the moving object, or may output a warning sound.

Figure 15:
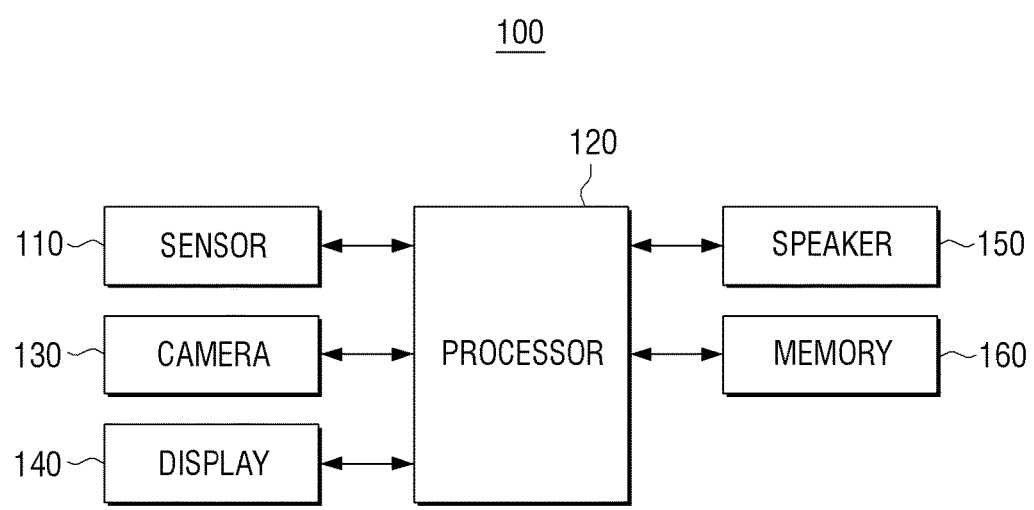
FIG. 15 is a block diagram illustrating a configuration of an electronic device, according to an embodiment of the present disclosure.

FIG. 15 is a block diagram illustrating a configuration of an electronic device, according to an embodiment of the present disclosure.

Referring to FIG. 15, the electronic device 100 includes a camera 130, a display 140, a speaker 150, and a memory 160, in addition to the sensor 110 and the processor 120, which may be controlled by the processor 120. The components illustrated in FIG. 15 only represent a single embodiment, and additional components may be added according to an implementation or at least one component may be removed.

The camera 130 is disposed on a moving object to photograph a driver. That is, the camera 130 may photograph a face, an upper body, eyes, and the like of the driver. To this end, the camera 130 may be disposed at an upper end of the front window of the moving object.

The processor 120 may determine the state of the driver based on the image photographed by the camera.

That is, the processor 120 may analyze an image photographed by the camera to determine a degree of motion of the face and the upper body of the driver and whether or not eyes are closed, and to determine whether the driver is in a drowsy state.

For example, the processor 120 may determine that the driver is in a drowsy state when the driver's face and upper body momentarily or slowly move downward, or the driver's eyes are closed.

As such, the processor 120 may also determine the state of the driver using the camera 130 installed in the mobile body.

However, the camera 130 alone is likely to cause an error in determining the state of the driver due to external factors. For example, when the driver wears glasses or sunglasses, the user's eyes may not be accurately photographed, such that it is impossible to clearly determine whether the user is in a drowsy state.

When the processor 120 may not clearly determine the state of the driver with the photographed image, the processor 120 may determine the state of the driver based on the change in the magnitude of pressure sensed by the sensor 110.

However, the processor 120 may determine the state of the user based on the image photographed by the driver. Separately, the processor 120 may also determine the state of the user based on the magnitude of the pressure sensed by the sensor 110. In addition, the processor 120 may determine the state of the user using only one of these methods.

The display 140 may display driving information on the front window of the moving object. The display 140 may be a head-up display. The head-up display is a display that may provide navigation information or other information to a front face of a driver, that is, a region (for example, a windshield, etc.) that is not out of a main line of sight of a driver while a vehicle or an aircraft is driving.

The processor 120 may display various types of information on the display 140.

For example, the processor 120 may display information (e.g., navigation, speed, fuel amount, etc.) required for the driver to drive the mobile object.

In particular, the processor 120 may control the display 140 to display information related to the state of the user. That is, if it is determined that the user is sleeping, the processor 120 may output a warning message or a message for guiding that the driver is currently sleeping.

In this case, the processor 120 may also display the information in consideration of a gaze direction of the user.

Specifically, the processor 120 may display the information in the left region of the front window with respect to the seat when the gaze direction of the driver is directed to the left, and may display the information in the right region of the front window with respect to the seat when the gaze direction of the driver is directed to the right.

The speaker 150 is installed in a moving body to output various pieces of audio. In particular, if it is determined that the driver is in a drowsy state, the processor 120 may output a warning sound through a speaker or may output a voice informing that the driver is currently sleeping.

The processor 120 may receive instructions from other components through components such as a bus, decode the received instructions, and execute computations or data processing according to the decoded instructions.

In addition, the processor 120 may include a main processor and a sub processor, in which the sub processor may be a low power processor. At this point, the main processor and the sub processor may be implemented as one chip form or may be implemented as a separate chip. In addition, the sub processor may have a buffer or a stack type memory installed therein.

The processor 120 may be implemented as at least one of a graphic processing unit (GPU), a CPU, and an application processor (AP), or may be implemented as a single chip.

The memory 160 may store instructions or pieces of data that are received from the processor 120 or other components (e.g., the sensor 110, the camera 130, the display 140, the speaker 150, etc.) or generated from the processor 120 or other components. Further, the memory 160 may include programming modules such as a kernel, middleware, an application programming interface (API), and an application. Each of the programming modules described above may consist of software, firmware, hardware, or a combination of at least two thereof.

Further, the memory 160 may store various types of information associated with the operations of the electronic device 100.

The memory 160 may be implemented as various memories. For example, the memory may be implemented as an internal memory. The internal memory may include, for example, at least one of a volatile memory (e.g., dynamic RAM (DRAM), static RAM (SRAM), synchronous dynamic RAM (SDRAM), or the like) and a nonvolatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to one embodiment, the internal memory may take the form of a solid state drive (SSD). Further, the memory 150 may be implemented as an external memory. The external memory may further include flash drives such as a compact flash (CF), a secure digital (SD), a micro secure digital (micro-SD), a mini secure digital (Mini-SD), an extreme digital (xD), and MemoryStick.

The electronic device 100 may also perform operations described above by interworking with terminal devices, such as, for example, a mobile phone and a tablet.

The electronic device 100 may further include a communication chip for communication with the terminal device, such as, for example, Bluetooth and Wi-Fi.

For example, the electronic device 100 may transmit sensing data sensed by the piezoelectric sensor to the terminal device. The terminal device may determine the state of the driver using the sensing data and may transmit information on the state of the driver to the electronic device 100. Accordingly, the electronic device 100 may perform the corresponding operation according to the state of the driver.

Figure 16:
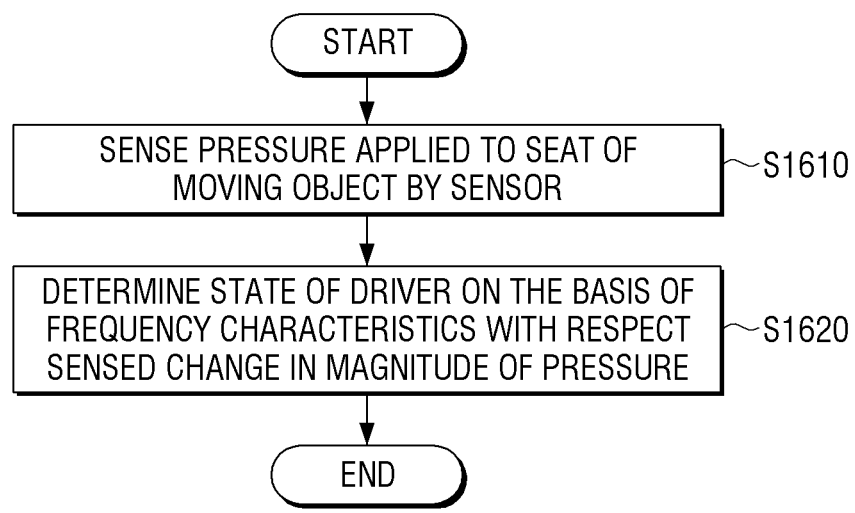
FIG. 16 is a flow chart illustrating a method of determining a state of a driver of an electronic apparatus, according to an embodiment of the present disclosure.

FIG. 16 is a flow chart illustrating a method of determining a state of a driver of an electronic apparatus, according to an embodiment of the present disclosure.

The pressure applied to the seat of the moving object is sensed by the driver, in step S1610. The pressure may be sensed by the plurality of piezoelectric sensors arranged on a seat in the matrix array.

The state of the driver is determined based on the frequency characteristics of the sensed change in the magnitude of the pressure, in step S1620.

Specifically, the difference in the sensed magnitude of the pressure at a predetermined time interval may be calculated and the frequency components of the calculated difference values may be analyzed to determine the state of the driver.

It may be determined that the driver is in a drowsy state in the time interval in which the frequency component for the difference in the magnitude of the pressure consists of a low frequency component.

Specifically, the calculated difference values are represented by the signals on a time basis, the signals in each of the preset time are subjected to Fourier transform to determine the frequency components of the signals in the respective time periods, and it may be determined that the driver is in a drowsy state in the time period in which the low frequency component is detected.

The feedback corresponding to the state of the driver may be provided. If it is determined that the driver is in a drowsy state, the speed of the moving object may be decreased or the preset audio may be output.

Embodiments of the present disclosure and the functional operations described herein may be performed in a digital electronic circuit or in computer software, firmware, or hardware that includes structures disclosed herein and their equivalent structures, or within at least one of combinations thereof.

A non-transitory computer readable medium, in which a program sequentially executing the method for determining a state of a driver of an electronic device according to the present disclosure is stored, may be provided.

The non-transitory computer readable medium is not a medium that stores data therein for a while, such as a register, a cache, a memory, or the like, but means a medium that semi-permanently stores data therein and is readable by a device. In detail, various applications and programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although buses are not illustrated in the block diagram of the electronic apparatus, communication between the respective components in the electronic apparatus may be performed through the buses. In addition, the electronic device may further include a processor such as a central processing unit (CPU), a microprocessor, or the like, that perform various processes described above.

At least one of the components, elements, modules or units represented by a block in the drawings may be embodied as various numbers of hardware, software and/or firmware structures that execute respective functions described above, according to an embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor, such as a CPU, that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Functional aspects of the embodiments may be implemented in algorithms that execute on one or more processors. Furthermore, the components, elements, modules, or units represented by a block or processing steps may employ any number of related art techniques for electronics configuration, signal processing and/or control, data processing and the like.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device, comprising:
   a sensor sensing a pressure applied, by a driver, to a seat of a moving object driven by the driver; and a processor determining that the driver is in a drowsy state in a time period, when a frequency component with respect to a change in the pressure sensed by the sensor is less than or equal to a preset threshold value.

2. The electronic device as claimed in claim 1, wherein the sensor comprises a plurality of piezoelectric sensors arranged on the seat in a matrix array.

3. The electronic device as claimed in claim 1, wherein the processor calculates a difference in a magnitude of the pressure sensed during the time period, and analyzes the frequency component of the difference.

4. The electronic device as claimed in claim 3, wherein the processor represents the calculated difference by signals on a time basis, and performs a frequency conversion on the signals in the time period to determine the frequency component of a waveform in the time period.

5. The electronic device as claimed in claim 1, wherein the processor provides feedback corresponding to the driver is in the drowsy state.

6. The electronic device as claimed in claim 5, wherein the processor controls a speed of the moving object to be decreased or controls a preset audio to be output.

7. A method for determining a state of a driver of an electronic device, comprising: sensing a pressure applied, by a driver, to a seat of a moving object driven by the driver; and determining that the driver is in a drowsy state in a time period, when a frequency component with respect to a change in the pressure is less than or equal to a preset threshold value.

8. The method as claimed in claim 6, wherein the pressure is sensed by a plurality of piezoelectric sensors arranged on the seat in a matrix array.

9. The method as claimed in claim 7, wherein determining the state of the driver comprises:
calculating a difference in a magnitude of the pressure sensed during the time period; and
analyzing the frequency component of the difference.

10. The method as claimed in claim 9, wherein determining the state of the driver comprises:
representing the calculated difference by signals on a time basis; and
performing a frequency conversion on the signals in the time period to determine the frequency component of a waveform in the time period.

11. The method as claimed in claim 7, further comprising:
providing feedback corresponding to the driver is in the drowsy state.

12. The method as claimed in claim 11, wherein providing the feedback comprises:
decreasing a speed of the moving object or outputting a preset audio.

13. An electronic device for detecting a state of a driver of a vehicle, comprising:
a sensor sensing pressures applied, by the driver, to regions of a seat of the vehicle; and
a processor calculating changes in the pressures, calculating magnitude characteristics and one or more frequency components of the changes, and determining whether the driver is in a drowsy state based on a comparison of the magnitude characteristics to a first threshold value and a comparison of the one or more frequency components to a second threshold value.

14. The electronic device of claim 13, wherein, when a magnitude characteristic for a specific time period is greater than or equal to the first threshold value, the processor determines that the driver is moving for purposes other than driving in the specific time period.

15. The electronic device of claim 13, wherein, when a magnitude characteristic for a specific time period is substantially zero, the processor determines that the driver is not moving.

16. The electronic device of claim 13, wherein, when a magnitude characteristic for a specific time period is less than the first threshold value and greater than zero, the processor determines that the driver is moving for purposes of driving or moving while in a drowsy state.

17. The electronic device of claim 16, wherein, the processor determines that the driver is moving for purposes of driving when a frequency component of the one or more frequency components is greater than or equal to the second threshold value, and the processor determines that the driver is moving while in the drowsy state when the frequency component is less than the second threshold value.

* * * * *